(12) United States Patent
Naqvi et al.

(10) Patent No.: US 10,268,468 B2
(45) Date of Patent: Apr. 23, 2019

(54) DYNAMIC RELEASE BASELINES IN A CONTINUOUS DELIVERY ENVIRONMENT

(71) Applicant: CA, Inc., Islandia, NY (US)

(72) Inventors: Shozab H. Naqvi, Dix Hills, NY (US); Tony Tsai, Oakland Gardens, NY (US); Bryan Perino, Smithtown, NY (US)

(73) Assignee: CA, Inc., Islandia, NY (US)

( * ) Notice: Subject to any disclaimer, the term of this patent is extended or adjusted under 35 U.S.C. 154(b) by 26 days.

(21) Appl. No.: 15/085,996

(22) Filed: Mar. 30, 2016

(65) Prior Publication Data

US 2017/0206076 A1    Jul. 20, 2017

Related U.S. Application Data

(63) Continuation of application No. 14/996,042, filed on Jan. 14, 2016.

(51) Int. Cl.
| | |
|---|---|
| *G06F 9/44* | (2018.01) |
| *G06F 9/45* | (2006.01) |
| *G06F 9/445* | (2018.01) |
| *G06F 8/65* | (2018.01) |
| *H04L 12/24* | (2006.01) |
| *H04L 29/08* | (2006.01) |
| *G06F 8/61* | (2018.01) |
| *H04L 29/06* | (2006.01) |

(52) U.S. Cl.
CPC .............. *G06F 8/65* (2013.01); *G06F 8/61* (2013.01); *H04L 41/082* (2013.01); *H04L 67/10* (2013.01); *H04L 67/34* (2013.01); *H04L 67/42* (2013.01)

(58) Field of Classification Search
CPC .............. G06F 8/61–8/65; H04L 67/10; H04L 41/082; H04L 67/34; H04L 67/42
See application file for complete search history.

(56) References Cited

U.S. PATENT DOCUMENTS 7,185,076 B1 * 2/2007 Novaes ................. G06F 9/5061
709/217
7,340,520 B1    3/2008 Jordan et al.
(Continued)

OTHER PUBLICATIONS

Sudhi Seshachala, Automation, Provisioning & Configuration Management (CHEF), 2015, pp. 1-7. https://devops.com/automation-provisioning-configuration-management-chef/.*
(Continued)

*Primary Examiner* — Mongbao Nguyen
(74) *Attorney, Agent, or Firm* — Alliance IP, LLC

(57) ABSTRACT

Embodiments of the present disclosure include a common interface for associating an ordered set of instructions and/or resources from a release automation application with a configuration manager node associated with a server type. Embodiments are directed to a single-click bootstrapping of an unassociated node to a configuration management server. Embodiments include receiving an indication to associate a node with a configuration management server; connecting to the node though a release automation agent; installing a configuration management server client; connecting to the configuration management server using the configuration management server client; and registering the node to the configuration management server.

6 Claims, 7 Drawing Sheets

(56) References Cited

U.S. PATENT DOCUMENTS

| | | | |
|---|---|---|---|
| 8,091,085 B2* | 1/2012 | Bealkowski | G06F 8/65 717/177 |
| 8,438,298 B2* | 5/2013 | Arai | G06F 8/65 709/203 |
| 9,077,611 B2* | 7/2015 | Cordray | H04L 41/0213 |
| 9,146,749 B1 | 9/2015 | Sivertsen | |
| 9,323,517 B2 | 4/2016 | West et al. | |
| 9,483,250 B2 | 11/2016 | Eilam et al. | |
| 9,600,267 B2 | 3/2017 | Chefalas et al. | |
| 9,680,951 B1* | 6/2017 | Graham-Cumming | H04L 67/02 |
| 9,690,557 B2 | 6/2017 | Srinivasamoorthy et al. | |
| 2003/0084156 A1* | 5/2003 | Graupner | G06F 9/5088 709/226 |
| 2005/0080801 A1* | 4/2005 | Kothandaraman | H04L 67/06 |
| 2009/0287799 A1* | 11/2009 | Tameshige | G06F 8/61 709/220 |
| 2010/0058308 A1* | 3/2010 | Demshur | G06Q 10/06 717/168 |
| 2010/0107155 A1* | 4/2010 | Banerjee | G06F 8/60 717/177 |
| 2010/0325624 A1 | 12/2010 | Bartolo et al. | |
| 2012/0079450 A1 | 3/2012 | Reech et al. | |
| 2012/0233299 A1* | 9/2012 | Attanasio | G06F 8/60 709/220 |
| 2013/0152047 A1* | 6/2013 | Moorthi | G06F 11/368 717/124 |
| 2014/0033194 A1* | 1/2014 | Natchadalingam | G06F 8/65 717/173 |
| 2014/0075426 A1 | 3/2014 | West et al. | |
| 2015/0281344 A1* | 10/2015 | Grootwassink | H04L 67/104 713/168 |
| 2015/0350101 A1* | 12/2015 | Sinha | G06F 9/00 709/226 |
| 2016/0077816 A1 | 3/2016 | Eliam et al. | |
| 2016/0132314 A1 | 5/2016 | Solsona-Palomar et al. | |
| 2016/0179499 A1 | 6/2016 | Reeves et al. | |
| 2016/0188314 A1 | 6/2016 | Holmes | |
| 2016/0364255 A1 | 12/2016 | Shefalas et al. | |
| 2017/0012819 A1 | 1/2017 | Raheja et al. | |
| 2017/0031602 A1* | 2/2017 | Xu | G06F 8/65 |
| 2017/0034023 A1* | 2/2017 | Nickolov | H04L 43/0817 |
| 2017/0060612 A1* | 3/2017 | Ho | G06F 9/45558 |
| 2017/0206075 A1 | 7/2017 | Naqvi et al. | |
| 2018/0276000 A1* | 9/2018 | Roszak | G06F 9/4416 |

OTHER PUBLICATIONS

Rafael Fonseca, De-registering an instance from Chef and Sensu on termination in EC2 https://heyrafael.com/de-registering-an-instance-from-chef-and-sensu-on-termination-in-ec2/.*

Anirban Saha, Continuous deployment with Jenkins an Salt, 2015, pp. 1-26. https://heyrafael.com/de-registering-an-instance-from-chef-and-sensu-on-termination-in-ec2/.*

Martin J. Logan, Approaches to Applicaton Release Automation, 2014, pp. 1-6. https://devops.com/approaches-to-application-release-automation/.*

Leonardo G. Azevedo, Installation Service: Supporting Deployment of Scientific Software as a Service, 2015, pp. 1-6. https://ieeexplore.ieee.org/stamp/stamp.jsp?arnumber=7430148 (Year: 2015).*

Eduard Luchian, Automation of the Infrastructure and Services for an OpenStack Deployment Using Chef Tool, 2016, pp. 1-5. https://ieeexplore.ieee.org/stamp/stamp.jsp?arnumber=7753200 (Year: 2016).*

Paul Duvall, Agile DevOps: Infrastructure automation, 2012, pp. 1-7. https://www.ibm.com/developerworks/library/a-devops2/a-devops2-pdf.pdf (Year: 2012).*

Thomas Damgaard Nielsen, Private Cloud Configuration with MetaConfig, 2011, pp. 508-515. https://ieeexplore.ieee.org/stamp/stamp.jsp?tp=&arnumber=6008749 (Year: 2011).*

Micheal Irving, Development of an Operational Process for Continuous Delivery, 2016, pp. 1-21. https://web.wpi.edu/Pubs/E-project/Available/E-project-031316-105823/unrestricted/WallSt_Barclays2_paper_final_withMathMQP.pdf (Year: 2016).*

Honguk Woo, A virtualized, programmable content delivery network, 2014, pp. 159-167. https://web.wpi.edu/Pubs/E-project/Available/E-project-031316-105823/unrestricted/WallSt_Barclays2_paper_final_withMathMQP.pdf (Year: 2014).*

Wettinger, Johanes, "Deployment Aggregates—a Generic Deployment Automation Approach for Applications Operated in the Cloud," 2014 IEEE Computer Society, pp. 2-9.

Katsuno, Yashuharu, "An Automated Parallel Approach for Rapid Deployment of Composite Applicaiotn Servers", 2015, pp. 126-133; available online at URL: <https://ieeexplore.ieee.org/document/7092910/>.

Meyer, Stefan, "Quality Assurance for Open Source Software Configuration Management," (2013) pp. 454-461, available online at URL: <https://ieeexplore.ieee.org/document/7092910/>.

* cited by examiner

DYNAMIC RELEASE BASELINES IN A CONTINUOUS DELIVERY ENVIRONMENT

CLAIM OF PRIORITY

This application is a continuation (and claims the benefit of priority under 35 U.S.C. § 120) of co-pending U.S. patent application Serial No. U.S. Ser. No. 14/996,042, filed on Jan. 14, 2016, the entire contents of which are hereby incorporated by reference.

BACKGROUND

This disclosure pertains to application release orientation baselines, and more particularly, to dynamic release baselines in a continuous delivery environment Infrastructure configuration management solutions provide a mechanism to define and maintain a configuration state. Examples of infrastructure configuration management solutions include OpsCode Chef, Puppet Labs Puppet, CFEngine, Salt, Ansible, etc. These solutions establish and maintain configuration baselines at an infrastructure level and report on them at node type levels (e.g., Web Servers, Application Servers, Database Servers).

Configuration management solutions often adhere to a declarative or promise approach, whereby client agents on nodes check state against master servers that they are subscribed to for configuration control. In the case of Chef, the Chef client checks in with the Chef Server for its "Cookbooks" and "Recipes." If a definition has changed on the server side that applies to a Cookbook or Recipe that the client node is subscribed to, then the client can update, re-configure, or otherwise change itself to meet the configuration stipulated.

Additionally, if something has changed on the client due to a potential over-ride by an administrator or user, then those changes will be overridden and placed back into the state prescribed in the Cookbook or recipe. The configuration management solution can also provide a set of reports on this activity.

Release automation (RA) solutions also provide a mechanism to deploy custom developed applications by development teams onto server infrastructure. In some cases, these deployments may be on top of infrastructure that may be maintained by a configuration management solution. Release automation (RA) solutions orchestrate and control deployment of application components and their configuration settings across applications, versions of applications, individual deployments of those applications and deployments of those applications across many environments.

SUMMARY

This disclosure describes a solution for establishing application release oriented baselines from a dynamically changing configuration baselines of both infrastructure configuration management solutions and release automation solutions in a continuous delivery/devops environment.

Aspects of the embodiments are directed to a computer implemented method for updating a configuration manager with configuration baseline information. The method may include identifying a deployment environment for an application; selecting a server type for the deployment environment; selecting a configuration manager node associated with the server type; and creating an ordered set of instructions or resources based on the server type and the deployment environment for the application.

Aspects of the embodiments are directed to a computer implemented method that includes identifying an application; identifying a deployment environment for deploying the application; identifying a configuration manager; identifying a server type from a plurality of server types available for the application; identifying a configuration management node associated with the server type; identifying a configuration baseline for deploying the application in the deployment environment; defining an ordered set of instructions and/or resources for the configuration management node by selecting, from a list of recipes associated with the configuration management node, a recipe that is included in the configuration baseline; and associating the configuration management node with the application.

Some embodiments also include deploying the application in the deployment environment on the configuration management node; detecting an error in the deployment; determining a difference between a deployment runlist at the configuration management node and the configuration baseline for the application; and reporting the different to an administrator.

Some embodiments also include identifying the difference between the deployment runlist and the configuration baseline; and changing the deployment runlist at the configuration management node to reflect the configuration baseline.

Advantages of the present disclosure are readily apparent to those of skill in the art. Among the advantages are that the disclosure addresses how to maintain state and relationship and drift across infrastructure, application, environment and deployment angles.

The described approaches are flexible and generic enough to be used across the different specific implementations by vendor e.g. Puppet's manifests, Chef's cookbooks, Ansible's Playbooks, and other vendor equivalents.

The present disclosure addresses issues of visibility across unrelated instances of configuration management solutions.

The present disclosure also describes dynamic reassignment of nodes to different Configuration Management vendor (e.g. Chef) Environments depending on the Release Automation deployment run (by application and RA environment).

The present disclosure describes providing a simulated impact of change to a Dynamic Release Baseline in a Continuous Delivery world and a simulated impact of configuration changes on an application deployment.

Aspects of the embodiments are directed to a method for associating a node with a configuration management server. The method may include receiving an indication to associate a node with a configuration management server; connecting to the node though a release automation agent; installing a configuration management server client; connecting to the configuration management server using the configuration management server client; and registering the node to the configuration management server.

8. A computer program product comprising a computer readable storage medium comprising computer readable program code embodied therewith, the computer readable program code comprising:

computer readable program code configured to receive an indication to associate a node with a configuration management server;

computer readable program code configured to connect to the node though a release automation agent;

computer readable program code configured to install a configuration management server client; and computer readable program code configured to connect to the configuration management server using the configuration management server client;

and computer readable program code configured to register the node to the configuration management server.

Aspects of the embodiments are directed to a system that includes a release automation (RA) server implemented at least partially in hardware and a user interface. The RA server may include an application; and a development environment associated with a server type. The system may include a configuration manager implemented at least partially in hardware that includes a server hosting logic executable to configure the server according to the server type; and deploy the application in the deployment environment on the server type. The user interface to accept inputs to map a configuration baseline for the application to run in the development environment to the server associated with the server type. The user interface may include a user-selectable bootstrap button, the user-selectable bootstrap button facilitating single click association of a node with the server of the configuration management.

Some embodiments may also include, upon receiving the indication to associate a node with a configuration management server, connecting to the node through the release automation agent; and downloading the configuration management server client.

Some embodiments may also include, registering the node with the configuration management server.

In some embodiments, the configuration management server is a second configuration management server and the node is associated with a first configuration management server. Some embodiments may also include connecting to the first configuration management server; deregistering the node from the first configuration management server; and registering the node with the second configuration management server.

Some embodiments may also include, deregistering the node from the configuration management server; and removing the configuration management server client from the node.

Some embodiments may also include, connecting the node to a different configuration management server.

In some embodiments, the indication comprises a single click on a bootstrap button on a common graphical user interface for the release automation agent to bootstrap the configuration management server client to the release automation agent.

DETAILED DESCRIPTION

Figure 1:
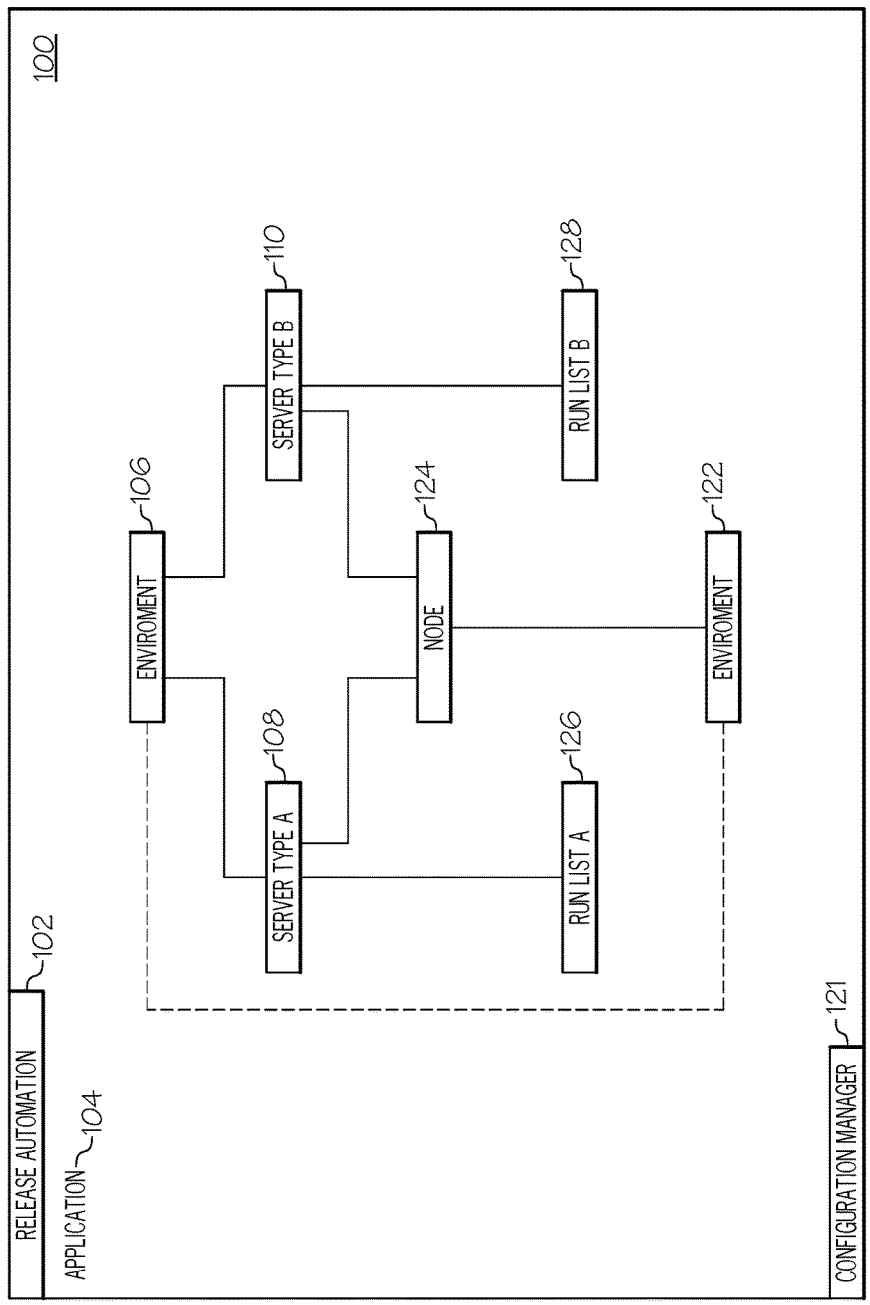
FIG. 1 is a simplified schematic diagram of a system for mapping configuration baselines to a configuration manager in accordance with embodiments of the present disclosure.

Configuration management solutions can perform comparison reporting of configurations (configuration drift reporting) unto their own domains. However, the configuration management solutions do not provide a way to combine the content from each domain and to provide a composite baselines of both infrastructure and application configurations in the dynamic world of Continuous Delivery. As a result, there is no effective automated way to ensure that, prior to deployment, the underlying infrastructure that the App/Release Automation teams expect to be in place. Often, automated deployments fail due to the underlying infrastructure not being in the expected state that the application needs it to be in.

This disclosure describes a common interface and a mechanism whereby an application baseline in a Release Automation (RA) can be associated with the configuration baselines from infrastructure configuration management solutions to establish a combined infrastructure and application configuration baseline that facilitates: 1) the dynamic pre-deployment state checking to ensure environments are at appropriate state, thereby ensuring more successful deployments; 2) dynamic custom application code deployments onto these severs; and 3) cross solution, infrastructure, application, release and environment reporting and analytics.

The term configuration baseline (or "baseline" for short) means a set of instructions and/or resources listed in a specific order for executing an application in a particular deployment environment (e.g., QA, production, etc.). Each configuration management solution uses terms that are analogous to the term "configuration baseline." The following table provides terminology used by a select number of configuration managers:

TABLE 1

| Config. Mgr. | Server Name | Terminology |
| --- | --- | --- |
| Chef | Chef-Server | Kitchen > Cookbook > Recipe |
| Puppet | PuppetMaster | Manifest > Class |
| CFEngine | | Bundle > Promises |
| Salt | | Modules > Actions |
| Ansible | | Playbooks > Modules |

To clarify, the term configuration baseline is analogous to an ordered set of "recipes" from Chef or an ordered set of "classes" from Puppet, etc. In Chef, an ordered set of recipes is called a "runlist." In Puppet, an ordered set is called a "catalog." In Chef, a role can be defined that includes an ordered grouping of recipes. So in Chef, a runlist can includes recipes and/or roles. The term "configuration baseline" is used in this patent application to refer to the ordered set of instructions and/or resources on the RA side, whereas runlist is used to refer to the ordered set of instructions or resources created in the common interface based on the configuration baseline on the RA. It is understood, however, that the term runlist is not being used to limit the implementation of this disclosure to Chef configuration managers and that other configuration managers can be used.

This disclosure uses Chef and Chef terminology as an example implementation and for illustrative purposes only.

It is understood, however, that other configuration managers are contemplated and are within the scope of the claims.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a simplified schematic diagram of a system 100 for mapping configuration baselines to a configuration manager in accordance with embodiments of the present disclosure. System 100 includes a release automation server 102 and a configuration manager 120. The release automation (RA) server 102 can include an application 104. The application 104 is intended for deployment in a deployment environment 106. A deployment environment can include, for example, a quality assurance (QA) environment, a developer (Dev) environment, production, etc. For the application 104 to be deployed in environment 106, a server type (e.g., server type A 108 or server type B 110) can be identified that are used to run the application. A server type can be, for example, a virtualization of a server type database, a server type web server, etc. Additionally, for each server type, a configuration baseline is identified that includes the requisite programs, settings, etc. for the application to run.

The system 100 also include a configuration manager 120, which can be provided by Chef, Puppet, etc. The configuration manager 120 manages server configurations for various deployment scenarios. The configuration manager 120 can include a configuration management node 124. The configuration management node 124 can be a server that can be associated with different server types 108, 110, etc. A configuration management node 124 can be considered a "node." The configuration management node 124 can be associated with a deployment environment 122 within the configuration manager 120. The configuration management node 124 can include a runlist, such as runlist A 126 and runlist B 128. The runlist can be an ordered set of configuration manager recipes.

In certain aspects of the embodiments, the runlist A 126 can be defined for a server type A 108 associated with node 124. The runlist A 126 can be defined based on a configuration baseline for executing application 104 on deployment environment 106.

By defining runlists for nodes 124 based on configuration baselines of applications for deployment on particular environments, the nodes can by dynamically reassigned to be used for running applications in different environments. Put differently, nodes can be dynamically reassigned to different environments 122 depending on the Release Automation deployment run (by application 104 and RA environment 106). This allows us to associate multiple run lists to a single node within the context of the server type and RA environment (RA environments are unique to applications). This in turn configures nodes to have multiple state types—the differentiating factor is the dynamic reassignment of the Chef Environment.

Additionally, by predefining the runlists based on the configuration baselines, a deployment of the application on the configuration management node can reveal drifts in runlist recipes as compared with the configuration baseline defined for the application and the deployment environment.

Figure 2:
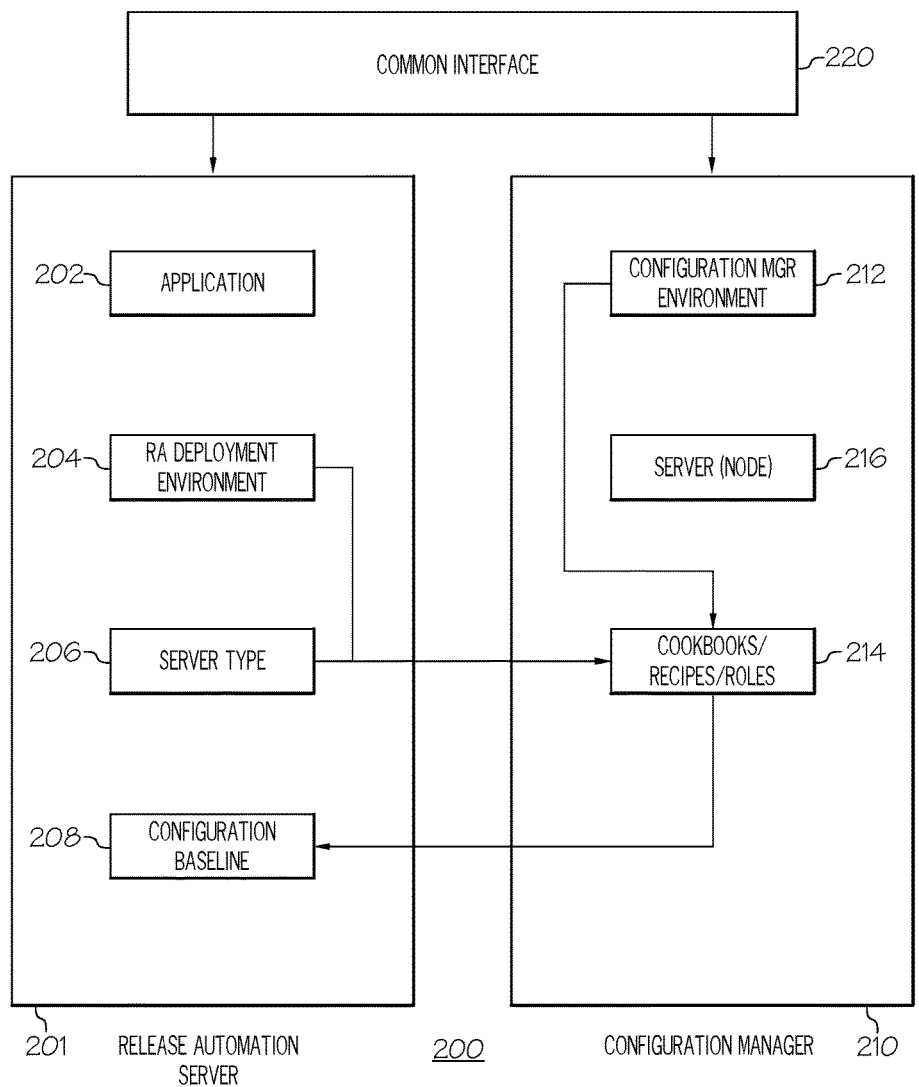
FIG. 2 is a schematic block diagram of system features of a release automation mapping baseline configuration to a configuration manager.

FIG. 2 is a schematic block diagram of system features 200 of a release automation interface for mapping configuration baseline 208 to a runlist 216 of a configuration manager. The system features 200 include a release automation server side and a configuration manager side, and each side's corresponding constituent components for mapping the configuration baseline 208 to the runlist 216. A user interface 220 can be provided that links constituent components from the RA server 201 to the configuration manager 210. The common user interface 220 allows a user to create a runlist for a selected server type and store the runlist locally for future deployment on a configuration manager node.

The RA server 201 can include an application 202 to be run in a deployment environment 204. To do so, a server type 206 can be identified that is needed to run the application. For each server type 206, there is a corresponding configuration baseline 208.

To map the configuration baseline 208 to a runlist 216 of the configuration manager 210, a configuration management node 210 can first be identified that corresponds to an environment 212. Environment 212 may be defined to include similar characteristics as deployment environment 214. For example, the configuration management node 210 may include predefined recipes and cookbooks 218 suitable for the server type 206 used for the deployment of the application 202 in the deployment environment 204.

The mapping of a server type 206 to a configuration management node 214 can include defining a runlist 216. The runlist 216 can be defined based on mapping the configuration baseline 208 to the runlist 216. Mapping can mean creating a runlist in the common interface, associating the runlist with the server type, and storing the runlist at the RA side for later deployment. For example, deployment requirements identified in the configuration baseline 208 can be selected from available recipes or cookbooks 212. The availability of a recipe or a cookbook 212 for mapping can be based on the configuration management environment rules, which may be based on the selection of the server type, the corresponding configuration management node 214, etc.

Figure 3:
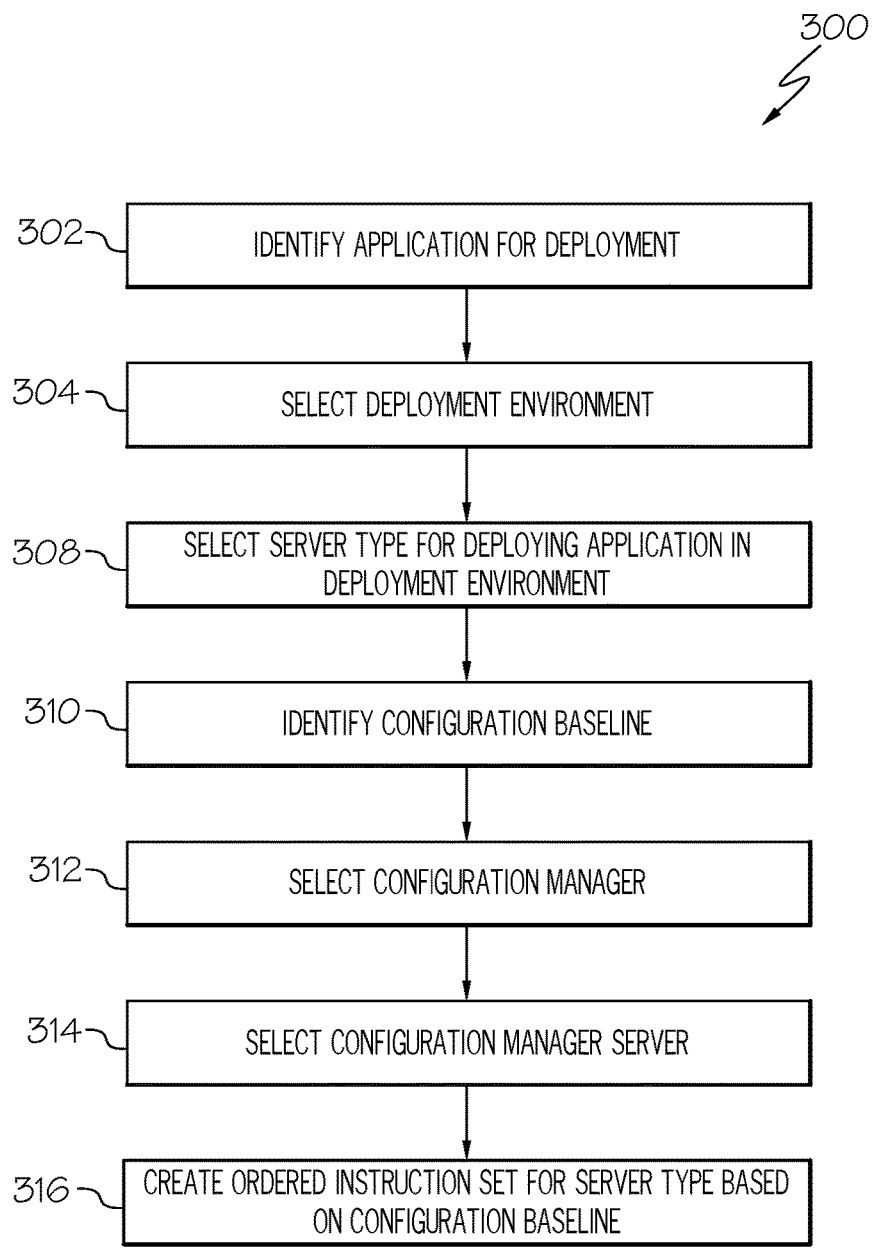
FIG. 3 is a process flow diagram for defining an ordered set of instructions and/or resources for executing an application on a configuration management node.

FIG. 3 is a process flow diagram 300 for mapping configuration baselines to a runlist of a configuration manager. An application is identified for deployment (302). The application may be delivered from a successful build, for example. A deployment environment can be selected for deploying the application (304). For example, the application may be deployed for quality assurance, development, etc.

A server type required for running the application within the deployment environment can be identified (308). From the server type and the application and the deployment environment, a configuration baseline can be identified for each server type (310).

A configuration manager can be selected (312). For example a Chef or Puppet configuration manager can be selected. A configuration management node can be selected based on the deployment environment (314). The configuration management node runlist can be defined based on the configuration baseline (316).

Figure 4:
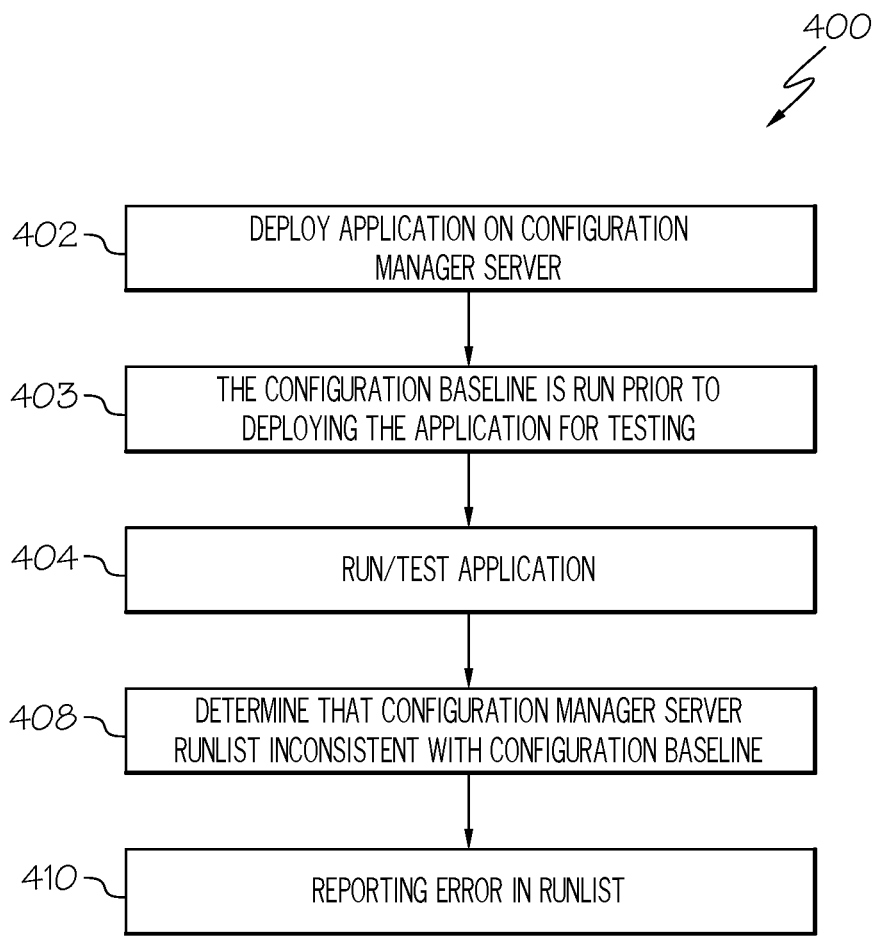
FIG. 4 is a process flow diagram of testing an application after mapping configuration baseline to a runlist of a configuration manager.

FIG. 4 is a process flow diagram 400 of testing an application after mapping configuration baseline to a runlist of a configuration manager. An application can be deployed on a configuration management node (402). The configuration management node can include a runlist for running the application based on a deployment environment. The runlist can be defined based on the configuration baseline for the application and deployment environment. The configuration can be executed (403), and then the application can be deployed for testing (404).

It can be determined that the runlist is inconsistent with the configuration baseline (406). For example, the runlist may include an incorrect recipe or version etc. The inconsistency can be reported to correct the problem (408).

Figure 5:
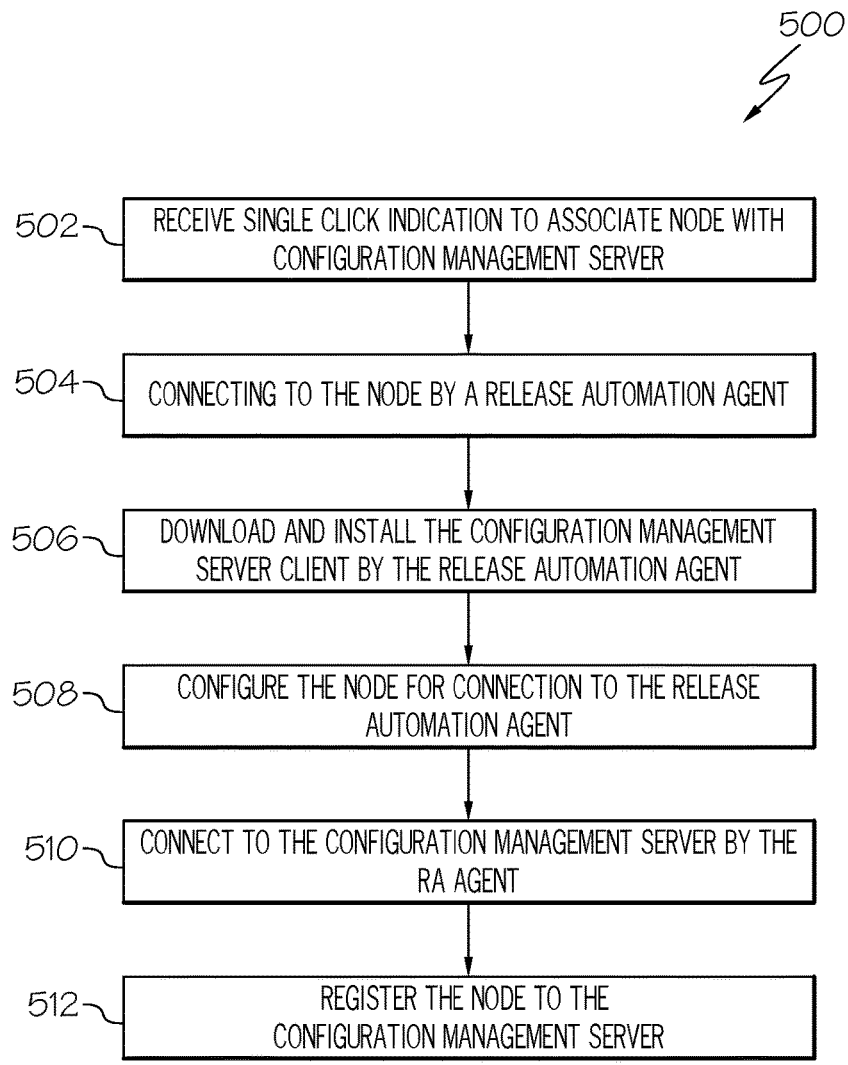
FIG. 5 is a process flow diagram for associating a node with a configuration management server.

FIG. 5 is a process flow diagram 500 for associating a node with a configuration management server. The common interface can be used to associate a node with a configuration server using a single button click or mouse click (e.g., such as a "bootstrap" button). A user can click on the bootstrap button in the common interface (502). The release automation system can use an RA agent to connect to the node (504). The RA agent can download and install chef-client on the node (506). The node can be configured for connection to the configuration management server (508). For example, a client.rb file can be created on the node. The RA agent can connect to the Chef Workstation and copy the the validation.pem file for the chef-server to the node (510). Now, the RA agent can connect to the Chef Workstation and run the knife command to register the node to the chef server (512). The Connection Status of the node changes to Connected on the UI.

Figure 6:
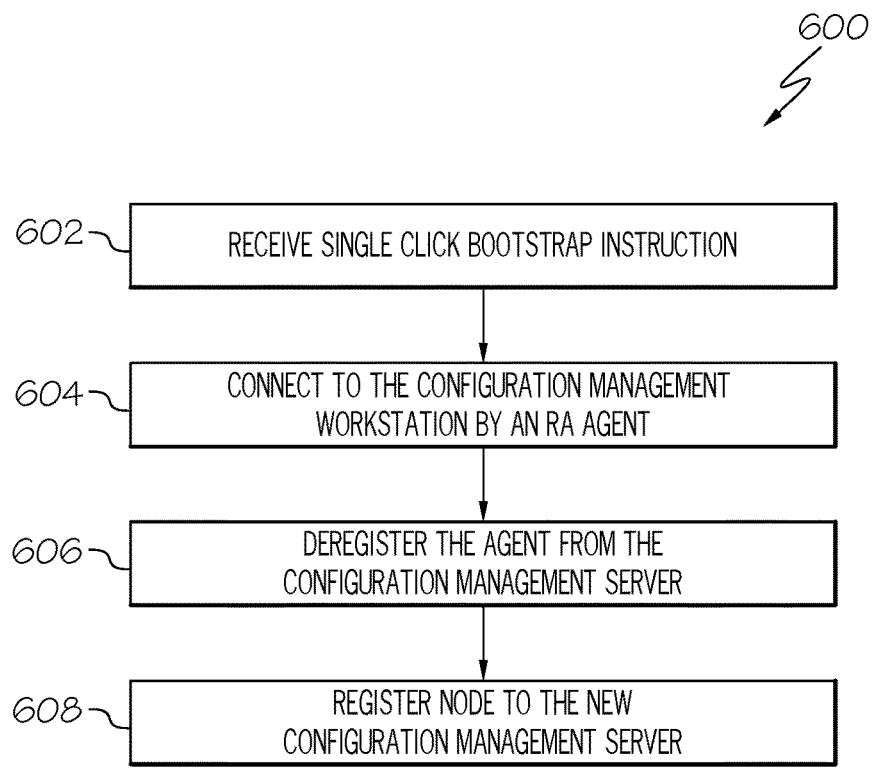
FIG. 6 is a process flow diagram for associating a node from a first server for a configuration manager to a different server for the configuration manager.

FIG. 6 is a process flow diagram 600 for associating a node from a first server for a configuration manager to a different server for the configuration manager. The common interface can be used to change node associations from a first server for a configuration manager to a different server for the same configuration manager using a single button click or mouse click (e.g., such as a "bootstrap" button). A user can click on the bootstrap button in the common interface (602). An RA agent can connect to the configuration management workstation (604). The agent can be deregistered from the configuration management server (606). For example, to deregister a Chef node (nodeA.ca.com), run the following commands from a Chef workstation: knife node delete nodeA.ca.com-y; knife client delete nodeA.ca.com— y. The RA agent can connect to a new node for the configuration manager. The RA agent can be used to register the node to a new configuration management server (608).

Figure 7:
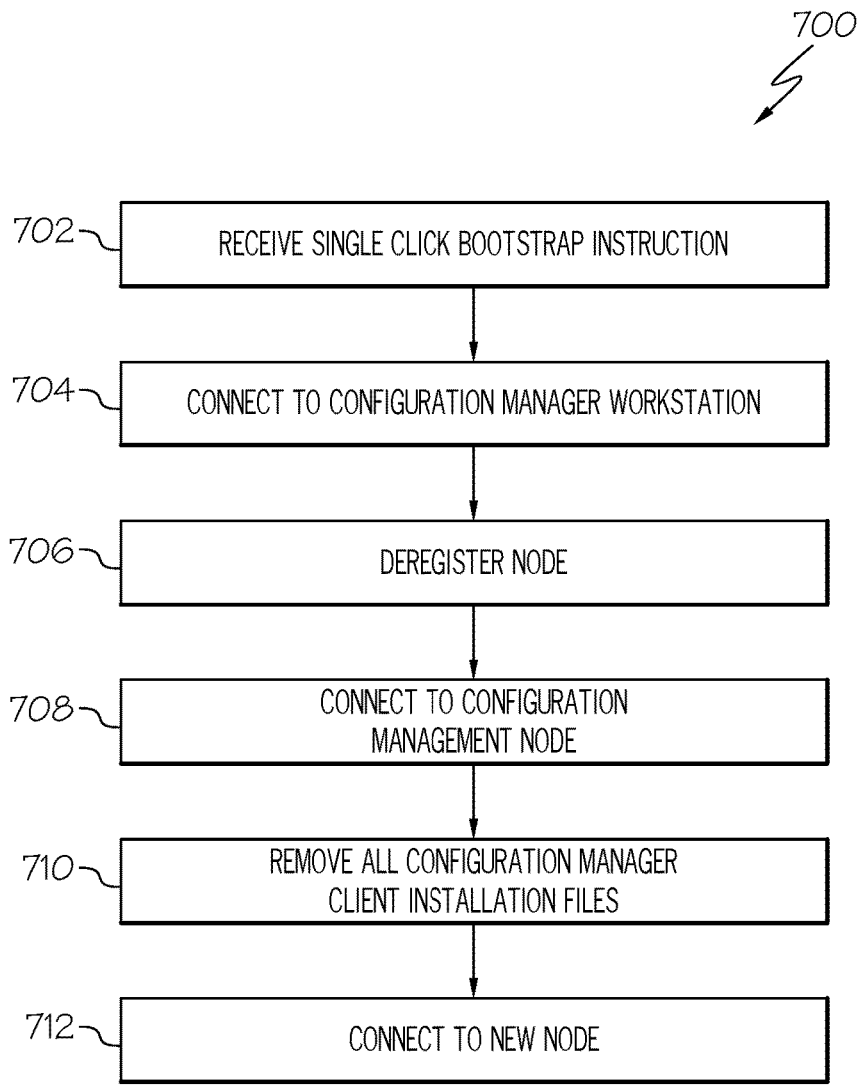
FIG. 7 is a process flow diagram for associating a node from a first configuration management server to a different configuration management server.

FIG. 7 is a process flow diagram 700 for associating a node from a first configuration manager to a different configuration manager. For example, FIG. 7 describes how to switch from Chef to Puppet (or more generally, from one vendor to another). Generally, the process includes receiving the single click for changing the configuration manager, deregistering the node from the existing configuration manager, and connecting the node to a new configuration manager. The details of each step are included in FIGS. 5 and 6 above.

The common interface can be used to associate a node from a first configuration management server to a different configuration management server using a single button click or mouse click (e.g., such as a "bootstrap" button). A user can click on the bootstrap button in the common interface (702). The RA agent can connect to Chef Workstation (704). The RA agent can deregister the configuration management node from the configuration management server (706). The following commands can be used to deregister a Chef Node from Chef Server: knife node delete nodeA.ca.com-y; knife client delete nodeA.ca.com-y. The RA agent can connect to the configuration management node (708). The RA agent can remove all the configuration manager Client installation files (710). The RA agent can then connect to a new node by installing the agent for the new configuration manager and registering the configuration manager agent with the configuration management serve (712).

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for associating a node with a configuration management server executed by a computer processor, the method comprising:

receiving an indication from a computer-based interface to associate the node with a configuration management server;

connecting to the node though a release automation agent across a computer network;

installing a configuration management server client;

connecting to the configuration management server using the configuration management server client across the computer network; and registering the node to the configuration management server;

wherein the indication comprises a single click on a bootstrap button on a common graphical user interface for the release automation agent to bootstrap the configuration management server client to the release automation agent, and interpreting the single click to execute program code by the computer processor to bootstrap the node with the configuration management server; and wherein the bootstrap of the configuration management server client to the release automation agent comprises downloading and installing the configuration management server client to the node;

the method further comprising:

upon receiving the indication to associate the node with the configuration management server, connecting to the node through the release automation agent; and downloading the configuration management server client;

deregistering the node from the configuration management server;

removing the configuration management server client from the node; and connecting the node to a different configuration management server;

wherein the connecting the node to a different configuration management server comprises the connecting from one of a Chef node, a Puppet node, a CFEngine node, a Salt node, or a Ansible node.

2. The method of claim 1, wherein the configuration management server is a second configuration management server and the node is associated with a first configuration management server, the method further comprising:

connecting to the first configuration management server;

deregistering the node from the first configuration management server; and registering the node with the second configuration management server.

3. A system comprising:

a release automation (RA) server implemented at least partially in hardware comprising:

an application; and a development environment associated with a server type;

a configuration manager implemented at least partially in hardware comprising:
  a server hosting logic executable to:
    configure the server according to the server type; and
    deploy the application in the deployment environment on the server type; and
  a user interface to accept inputs to map a configuration baseline for the application to run in the development environment to the server associated with the server type, wherein
the user interface comprises a user-selectable bootstrap button, the user-selectable bootstrap button facilitating single click association of a node with the server of the configuration manager, and interpreting the single click to execute program code by a computer processor to bootstrap the node with the configuration management server;
wherein the bootstrap of the configuration management server client to the release automation agent comprises downloading and installing the configuration management server client to the node;
the RA server comprising logic executable to:
  receive an indication by the user-selectable bootstrap button to associate a node with a configuration management server;
  connect to the node though a release automation agent;
  install a configuration management server client; and
  connect to the configuration management server using the configuration management server client;
  register the node to the configuration management server;
  upon receiving the indication to associate the node with the configuration management server, connecting to the node through the release automation agent;
  download the configuration management server client;
  deregister the node from the configuration management server; remove the configuration management server client from the node; and
  connect the node to a different configuration management server,
  wherein connect the node to a different configuration management server comprises the connecting from one of a Chef node, a Puppet node, a CFEngine node, a Salt node, or a Ansible node.

4. The system of claim 3, wherein the configuration management server is a second configuration management server and the node is associated with a first configuration management server, the RA server comprising logic executable to:
  connect to the first configuration management server;
  deregister the node from the first configuration management server; and
  register the node with the second configuration management server.

5. A non-transitory computer-readable medium having program instructions stored therein, wherein the program instructions are executable by a computer processor of a computer system to perform operations comprising:
  receiving an indication from a computer-based interface to associate a node with a configuration management server;
  connecting to the node though a release automation agent through a computer network;
  installing a configuration management server client; and
  connecting to the configuration management server using the configuration management server client through the computer network; and
  registering the node to the configuration management server;
  wherein the indication comprises a single click on a bootstrap button on a common graphical user interface for the release automation agent to bootstrap the configuration management server client to the release automation agent, and the operations further comprising interpreting the single click to execute program code by the computer processor to bootstrap the node with a configuration management server; and
  wherein the bootstrap of the configuration management server client to the release automation agent comprises downloading and installing the configuration management server client to the node;
  the operations further comprising, upon receiving the indication to associate the node with the configuration management server, connecting to the node through the release automation agent; and
  downloading the configuration management server client;
  deregistering the node from the configuration management server;
  removing the configuration management server client from the node; and
  connecting the node to a different configuration management server;
  wherein connecting the node to a different configuration management server comprises the connecting from one of a Chef node, a Puppet node, a CFEngine node, a Salt node, or a Ansible node.

6. The non-transitory computer-readable medium of claim 5, wherein the configuration management server is a second configuration management server and the node is associated with a first configuration management server, the operations further comprising:
  connecting to the first configuration management server;
  deregistering the node from the first configuration management server; and
  registering the node with the second configuration management server.

* * * * *